Aug. 19, 1924.
H. GARNER ET AL
1,505,552
MEANS FOR LUBRICATING ROTARY MEMBERS
Filed July 14, 1921  13 Sheets-Sheet 1
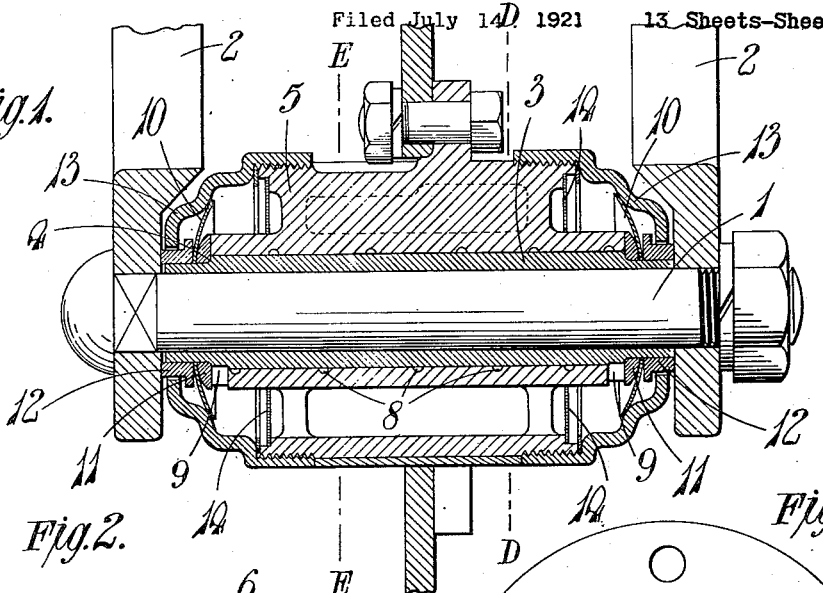

Aug. 19, 1924.                                                          1,505,552
H. GARNER ET AL
MEANS FOR LUBRICATING ROTARY MEMBERS
Filed July 14, 1921      13 Sheets-Sheet 2
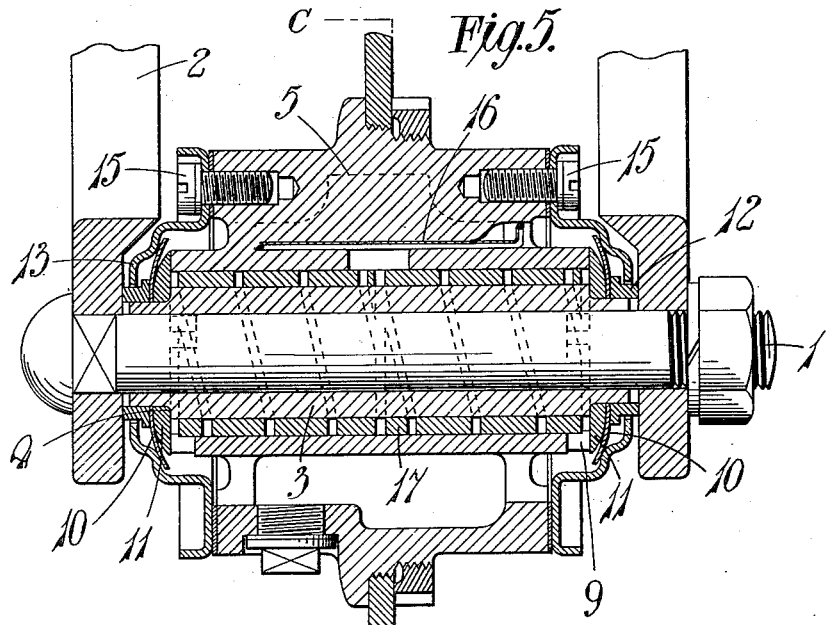
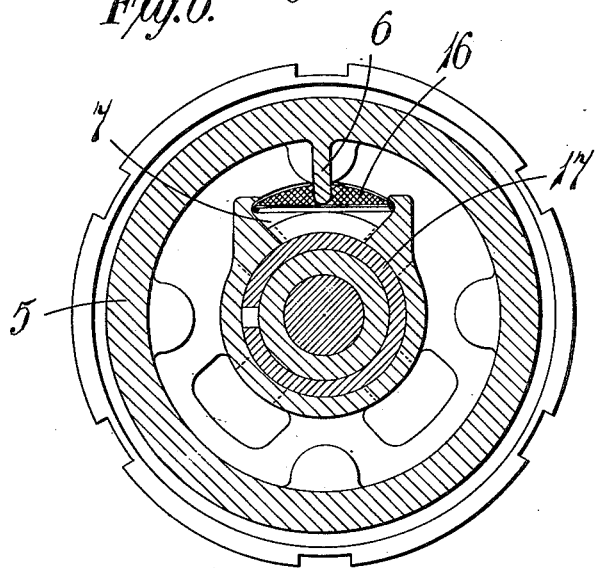

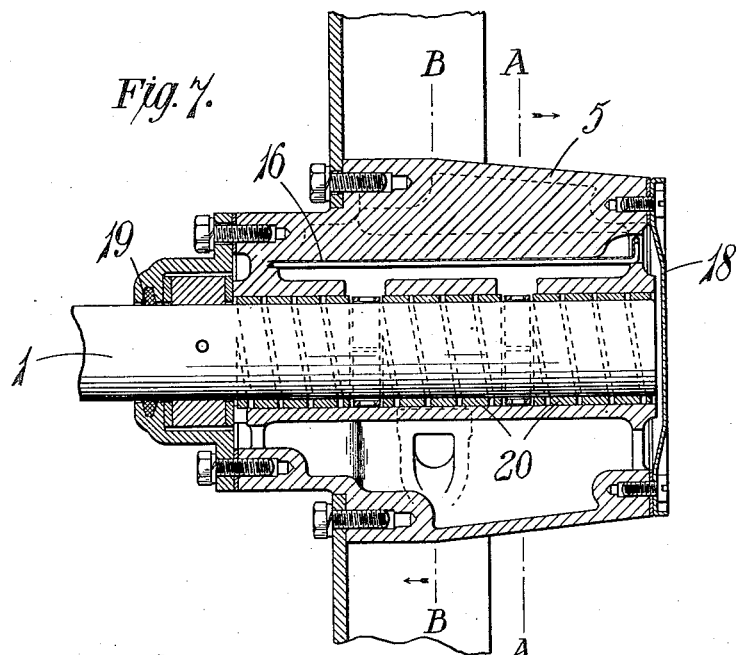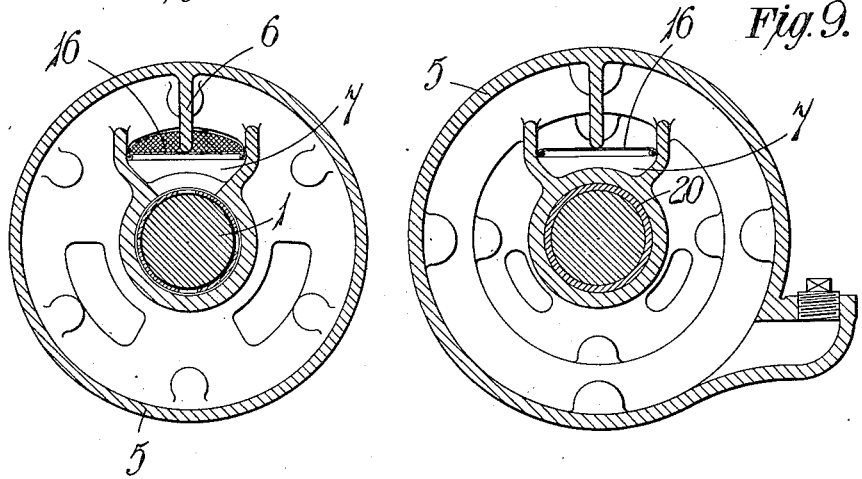

Aug. 19, 1924.

H. GARNER ET AL 1,505,552

MEANS FOR LUBRICATING ROTARY MEMBERS

Filed July 14, 1921    13 Sheets-Sheet 4

Aug. 19, 1924. 1,505,552
H. GARNER ET AL
MEANS FOR LUBRICATING ROTARY MEMBERS
Filed July 14, 1921 13 Sheets-Sheet 5

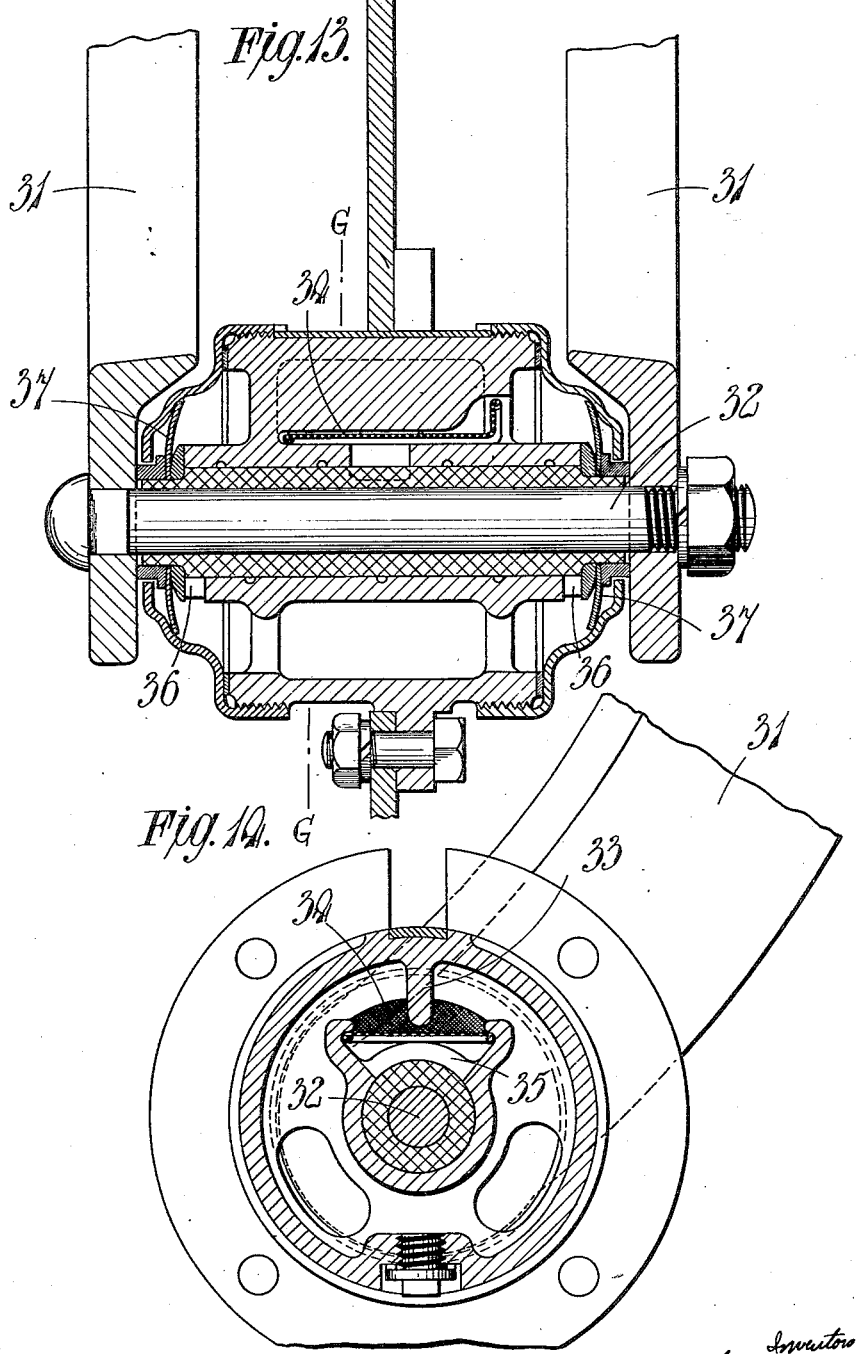

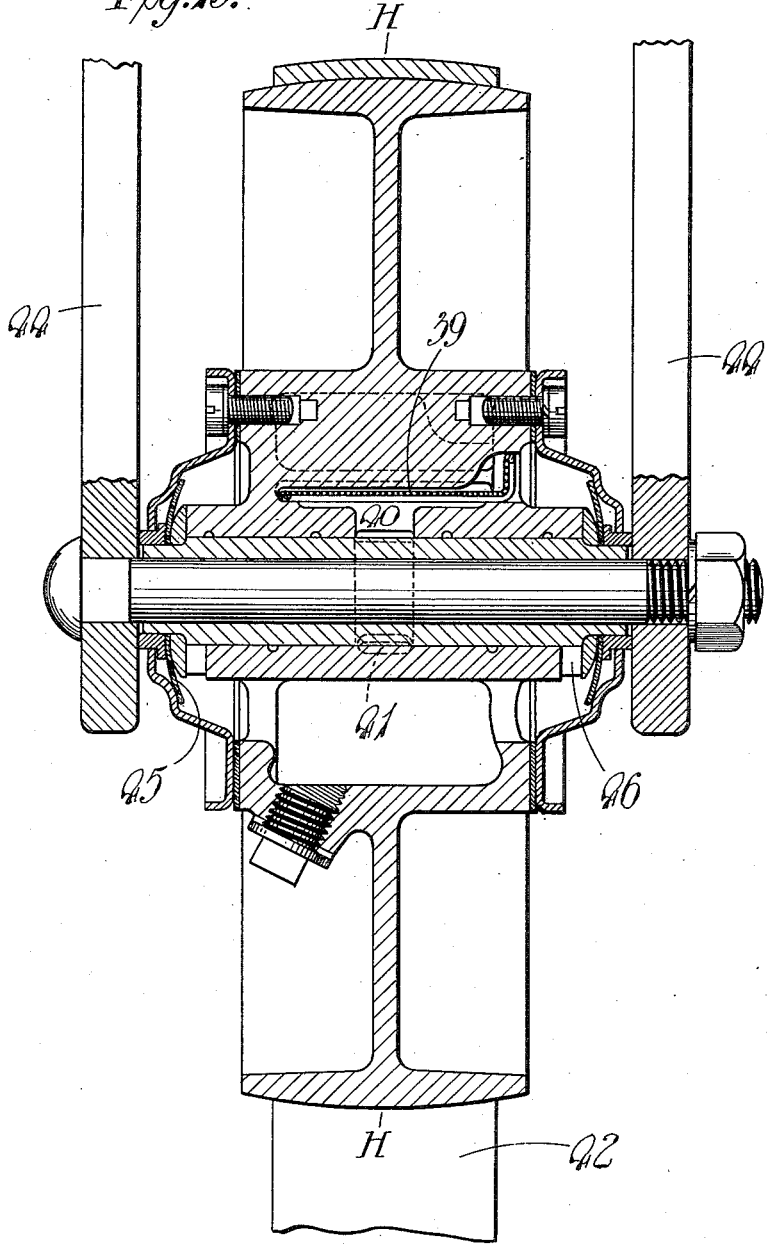

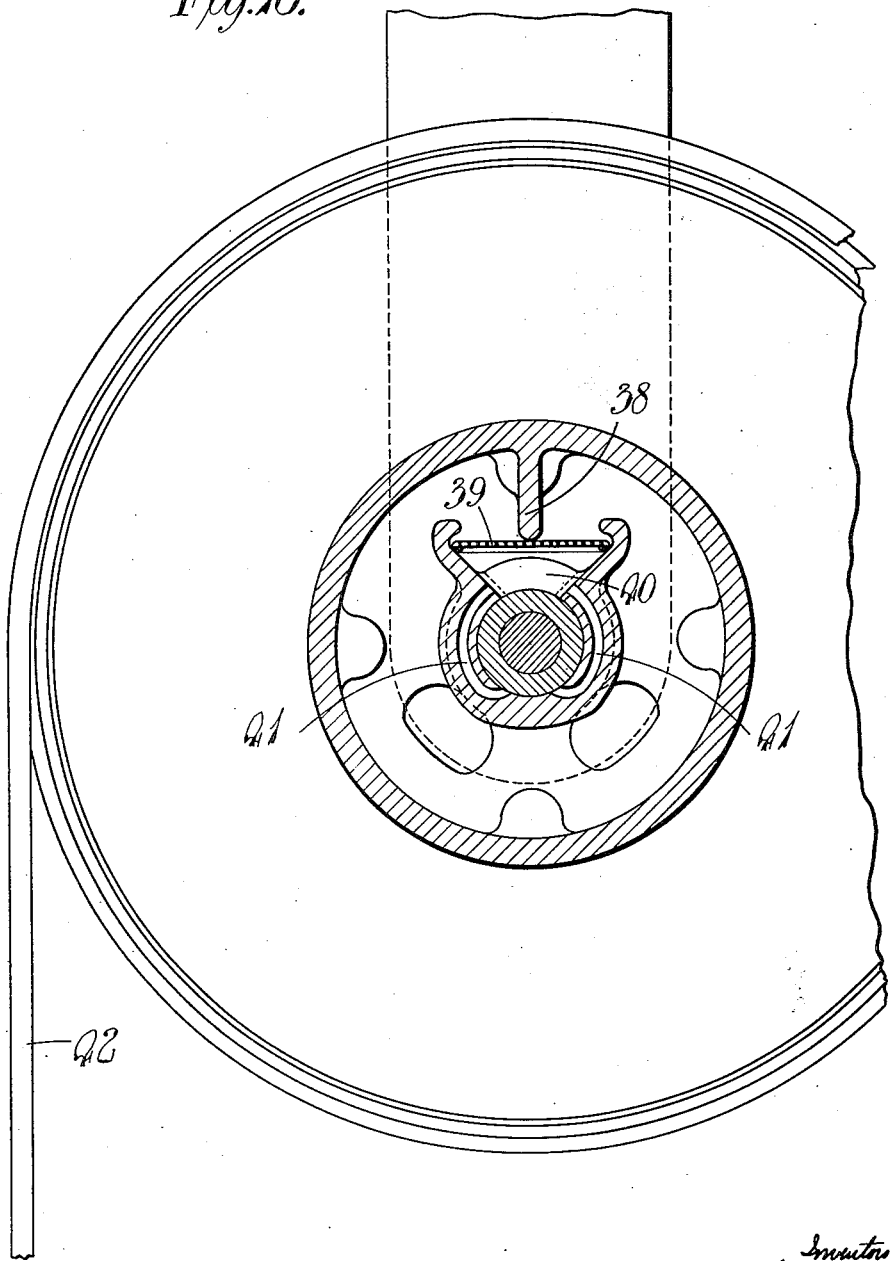

Aug. 19, 1924.

H. GARNER ET AL 1,505,552

MEANS FOR LUBRICATING ROTARY MEMBERS

Filed July 14, 1921   13 Sheets-Sheet 11

Aug. 19, 1924.

H. GARNER ET AL 1,505,552

MEANS FOR LUBRICATING ROTARY MEMBERS

Filed July 14, 1921   13 Sheets-Sheet 12

Aug. 19, 1924.

H. GARNER ET AL 1,505,552

MEANS FOR LUBRICATING ROTARY MEMBERS

Filed July 14, 1921    13 Sheets-Sheet 13

Patented Aug. 19, 1924.

1,505,552

UNITED STATES PATENT OFFICE.

HENRY GARNER AND JAMES PARKER GARNER, OF BIRMINGHAM, AND SYDNEY SMITH, OF LONDON, ENGLAND; SAID SMITH ASSIGNOR TO SAID JAMES PARKER GARNER AND SAID HENRY GARNER.

MEANS FOR LUBRICATING ROTARY MEMBERS.

Application filed July 14, 1921. Serial No. 484,655.

*To all whom it may concern:*

Be it known that we, HENRY GARNER, JAMES PARKER GARNER, and SYDNEY SMITH, subjects of the King of Great Britain, residing at Birmingham, in the county of Warwick, England, and London W., England, respectively, have invented a certain new or Improved Means for Lubricating Rotary Members; and we do hereby declare the following to be a full, clear, and exact description of the same.

This invention relates to means for lubricating slow speed rotary members wherein the centrifugal force due to rotation is insufficient to carry all the lubricant around with the rotating member.

More particularly our invention relates to that type of apparatus wherein the rotary member comprises a chamber forming a reservoir for the oil or lubricant and a vane or oil-lifting blade rotating with the chamber and adapted to lift the lubricant at each revolution and deliver it on to the hub, passages being provided through the hub so that the lubricant may reach the bearing. In bearings of this kind as at present proposed, it has been the practice to provide absorbent members or the like in the passages through the hub leading to the bearing so that there has been no free circulation of oil. Further, in such bearings it has not been suggested to provide means to prevent the lubricant from passing out at the ends of the bearing.

An important feature of the present invention is that an automatic and closed circulation of lubricant is set up and maintained, the oil being lifted by the vane and directed on to the bearing at any desired point, passing through the bearing, being prevented from escaping by the ends of the bearing and allowed to return to the oil reservoir automatically. Therefore by carefully designing the various ducts and passages for the lubricant we may determine accurately the amount of lubricant passing through the bearings at each revolution. Our invention may be stated, therefore, to comprise a chamber carried by or forming part of the rotary member, the blade or vane rotating with the rotary member and adapted to raise the lubricant at each revolution from the periphery of said chamber and to direct it on to the hub, one or more delivery passages through the hub disposed adjacent to the delivery end of said blade or scoop, one or more return passages through the hub, and a closure near each end of the hub to prevent the escape of lubricant between the hub and the axle whereby a closed circulation of lubricant is obtained automatically.

Our invention may include the further feature of the provision of gauze or other filters placed in the path of the oil, so that the lubricant is filtered at least once every revolution.

Our invention may further consist of particular means for preventing the escape of lubricant at the ends of the bearing by the provision of resilient retaining members secured upon the shaft or upon the sleeve associated therewith, the said resilient retaining members being preferably but not necessarily bent in assembling the bearing into a dished formation, being held in this position by securing caps and screwed on to the rotary part of the bearing, or are otherwise secured thereto.

A further feature of our invention consists in directing the lubricant or allowing the lubricant to find for itself that part of the circumference of the bearing where the pressure between the bearing surfaces is least.

It is well known that in practically all bearings the load is taken generally upon about half of the circumference of the bearing, the surfaces of the bearing at the other half being comparatively slack. It is between these surfaces that the lubricant is most easily able to enter the bearing, and we propose to provide means whereby the lubricant is either led to this part of the bearing or is allowed to find this part of the bearing for itself. It will be understood that the slack part of the bearing is sometimes the upper part or it may be the lower part, whilst in other cases it may be at the side, the position of the slack part being determined by the direction in which the load is operating. In some bearings, the slack part of the bearing alters when the direction of running or load alters, and we may make provision for this by supplying the bearing with lubricant over an arc or complete circle or the bearing is supplied with lubricant at the proper point for either direction of running.

Referring to the drawings:—

Figure 1 is a sectional view in side elevation shewing our invention applied to the hub of a disc coulter for a tractor plough.

Figure 2 is a section upon line D—D of Figure 1.

Figure 3 is a section on line E—E of Figure 1.

Figure 4 is a plan view of the bearing.

Figure 5 is a view in sectional side elevation shewing another form of bearing suitable for the hub of a disc coulter.

Figure 6 is a view in section on line C—C of Figure 5.

Figure 7 is a view in sectional side elevation shewing our invention applied to the driving or other wheel of an agricultural machine.

Figure 8 is a section on line A—A of Figure 7.

Figure 9 is a section on line B—B of Figure 7.

Figure 13 is a view in sectional side elevation of another form of bearing.

Figure 14 is a view in section upon line G—G of Figure 13 shewing a method of leading the lubricant to the top of the bearing.

Figure 15 is a sectional view in side elevation shewing a bearing in which ducts are provided for allowing the lubricant to pass to the lower side of the bearing so as to enter at the point of minimum pressure.

Figure 16 is a sectional view on line H—H of Figure 15.

Figure 10:
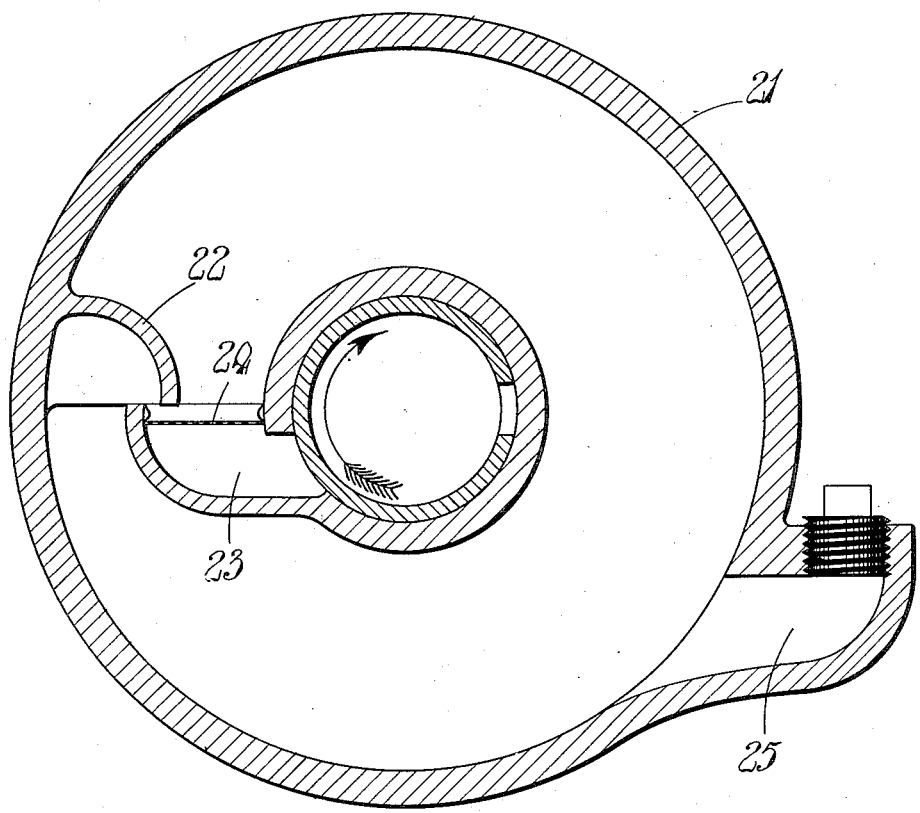
Figure 10 is a sectional view of a hub shewing a method of directing the lubricant to the side of the bearing.

In the construction shewn in Figures 1-4, the shaft or pin 1 is carried in the arms 2 and is stationary. The shaft or pin 1 is provided with a bush 3 having shoulders as shewn at 4. The hub 5 is mounted upon the sleeve 3 and this hub is of annular construction and forms a reservoir for the lubricant. The hub is provided with an in- wardly projecting vane or blade 6 which serves to lift the lubricant at each revolution and where it fits around the sleeve 3, the hub is provided with a pocket or oil-receiving chamber 7. It will be seen that the chamber 7 extends upon both sides of the vane 6, so that the pocket is able to receive the oil for either direction of rotation. The oil delivered from the vane 6 into the pocket 7 may pass along the bearing towards the ends and the internal surface of the hub may be provided with helical or other grooves, such as are shewn at 8 to facilitate the passage of the oil to the ends of the bearing. The lubricant leaves the bearing at the ends through passages 9 which are situated in this case diametrically opposite to the pocket 7. The passages 9, however, are spaced apart from the pocket 7 laterally, so that the oil is obliged to flow along the bearing in addition to flowing around the bearing, in order to reach the return passages 9. The oil is prevented from escaping at the ends of the bearing by washers 10 which are formed from discs of resilient sheet metal. These washers 10 are mounted on the sleeve 3 between thrust washers and distance collars 12. These washers 10 are normally flat but are bent into dished forms by the act of assembling the bearing, the washers being held in their bent position by the securing caps 13, which are screwed on to the hub 5.

After leaving the passages 9, the oil flows back to the base of the annular chamber formed within the hub, but in doing so it necessarily passes through the gauze or other filter 14.

The construction shewn in Figures 5 and 6 is somewhat similar, and in these figures, those parts which are similar to the parts shewn in Figures 1-4 are marked with similar reference numerals. In this construction, however, the securing caps for the washers 10 are secured by screws 15. In this construction also the gauze or other filter is provided at the entrance to the oil pocket 7. In this case the filter is denoted by the reference 16.

In addition to these differences, the construction shewn in Figures 5 and 6 includes what may be termed a floating member 17.

The construction shewn in Figures 7 8 and 9 illustrates an application of the invention to the wheel of a tractor and in this case washers such as 10, to prevent the escape of lubricant at the ends, are replaced at one end by a cap 18, which entirely encloses one end of the bearing.

In this construction the gauze or other filter is placed at the entrance to the pocket 7.

At that end of the bearing which is opposite to the cap 18 a felt washer 19 is provided for preventing the escape of lubricant at this end.

A floating member such as is shewn at 17 in Figures 5 and 6 is also mounted in this construction and is denoted by the reference 20.

In Figure 10 a sectional view of the bearing is shewn where what is termed the arc of pressure is at the top of the bearing, and it is consequently important to lead the lubricant to the lower part of the bearing preferably at what may be termed the beginning of the arc of pressure, when considering the direction of rotation which is indicated by an arrow.

In this construction the rotary member 21 is provided with a vane 22 which is adapted to deliver the lubricant in the pocket 23, the upper part of which may be fitted with a filter 24, the pocket 23 leads direct to the bearing, and it will be understood that any suitable means, such as that already described, will be provided for preventing the escape of lubricant at the ends of the bearing.

Instead of using the vane as shewn at 22, the pocket 23 may be extended to the periphery of the hub 21.

A filler opening is provided as shewn at 25.

Figure 11:
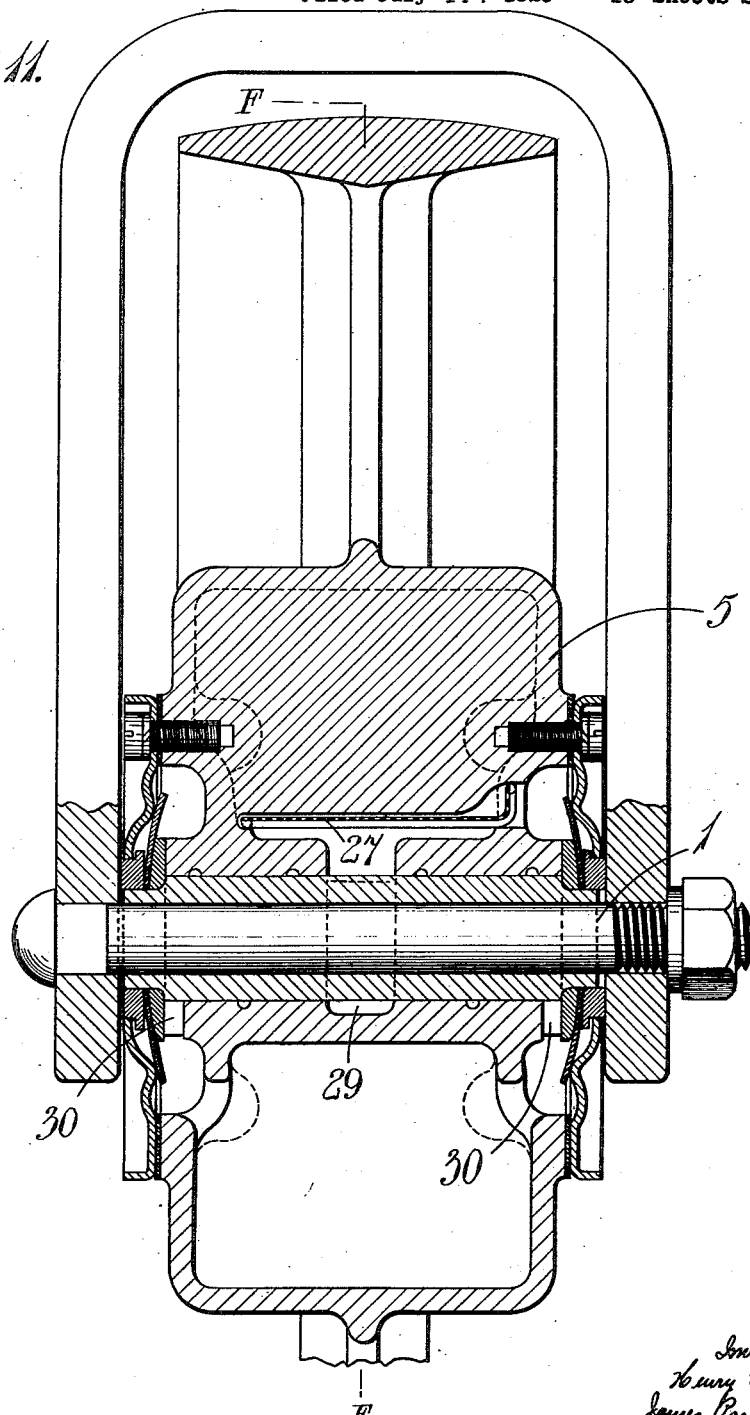
Figure 11 is a sectional view in side elevation shewing our invention applied to the wheel of a tractor and shewing the method employed for allowing the lubricant to select its own point of entry to the bearing.
Figure 12:
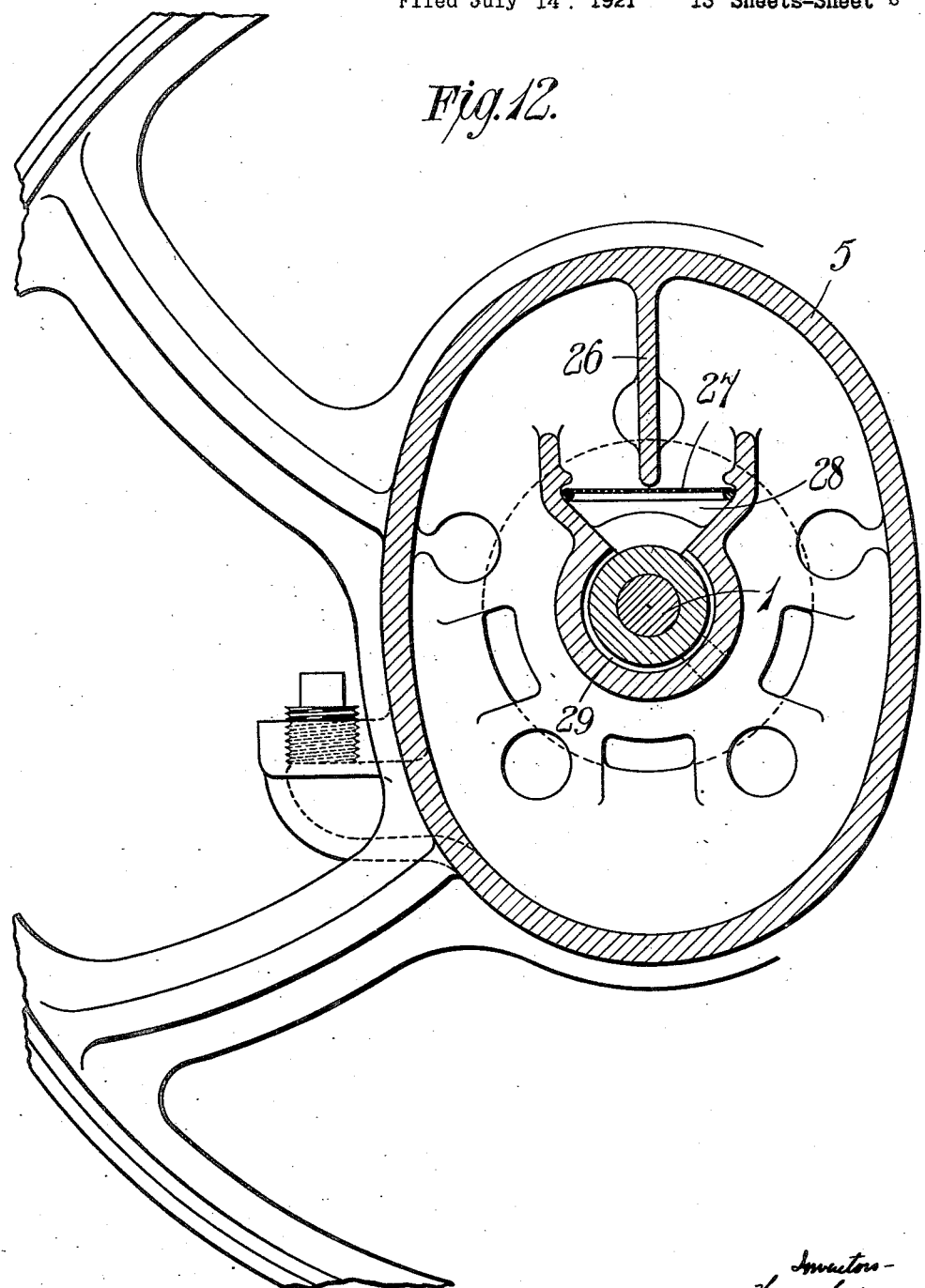
Figure 12 is a view in section on line F—F of Figure 11.

In the construction shewn in Figures 11 and 12, an oil chamber of elliptical cross section is shewn instead of a chamber of circular cross section. The actual cross section of the oil chamber is unimportant when carrying out our invention.

In the construction shewn in Figures 11 and 12, the lubricant is carried by the vane 26 and delivered through a filter 27 into a pocket 28. The pocket 28 leads to what may be termed an annular duct 29, passing completely around the centre of the bearing. By providing the duct 29 the oil is given an opportunity for freely selecting its point of entry into the bearing.

In this construction as shewn in Figure 11, the hereinbefore described resilient washers for preventing the escape of lubricant at the ends of the bearing and return passages for the lubricant are provided as shewn at 30 in Figure 11.

In Figures 13 and 14 is shewn a construction in which the oil is led to the top of the bearing, the arc of pressure being at the bottom and rather to the left hand side of the bearing. The bearing shewn in these figures is applied to a disc coulter wherein the arms or forks 31 are inclined. The shaft 32 is pressed in a downward direction in alignment with the arms 31. In this construction the oil is led by the vane 33 through the filter 34 into the pocket 35 whence it passes to the bearing, return passages 36 being provided at the ends and resilient washers 37 similar to those already described being provided to prevent the escape of oil at the ends of the bearing as shewn.

In the construction shewn in Figures 15 and 16 the bearing is shewn wherein the arc of maximum pressure is at the upper part of the bearing. In this construction the hub is provided with a vane 38 which leads the oil through the filter 39 into the pocket 40. The pocket 40 is provided with two ducts 41, one for each direction of rotation, which lead the oil round to the lower part of the bearing and thus allow it to enter at that part of the bearing which is subject to the least pressure.

In these figures is shewn our invention applied to a pulley in which the belt 42 is exerting downward pressure upon the pulley, the shaft being suspended by the arms 44. Means for providing against the escape of lubricant at the ends are the same as those already described and include the resilient washers 45, whilst return passages for the lubricant are shewn at 46.

Figure 17:
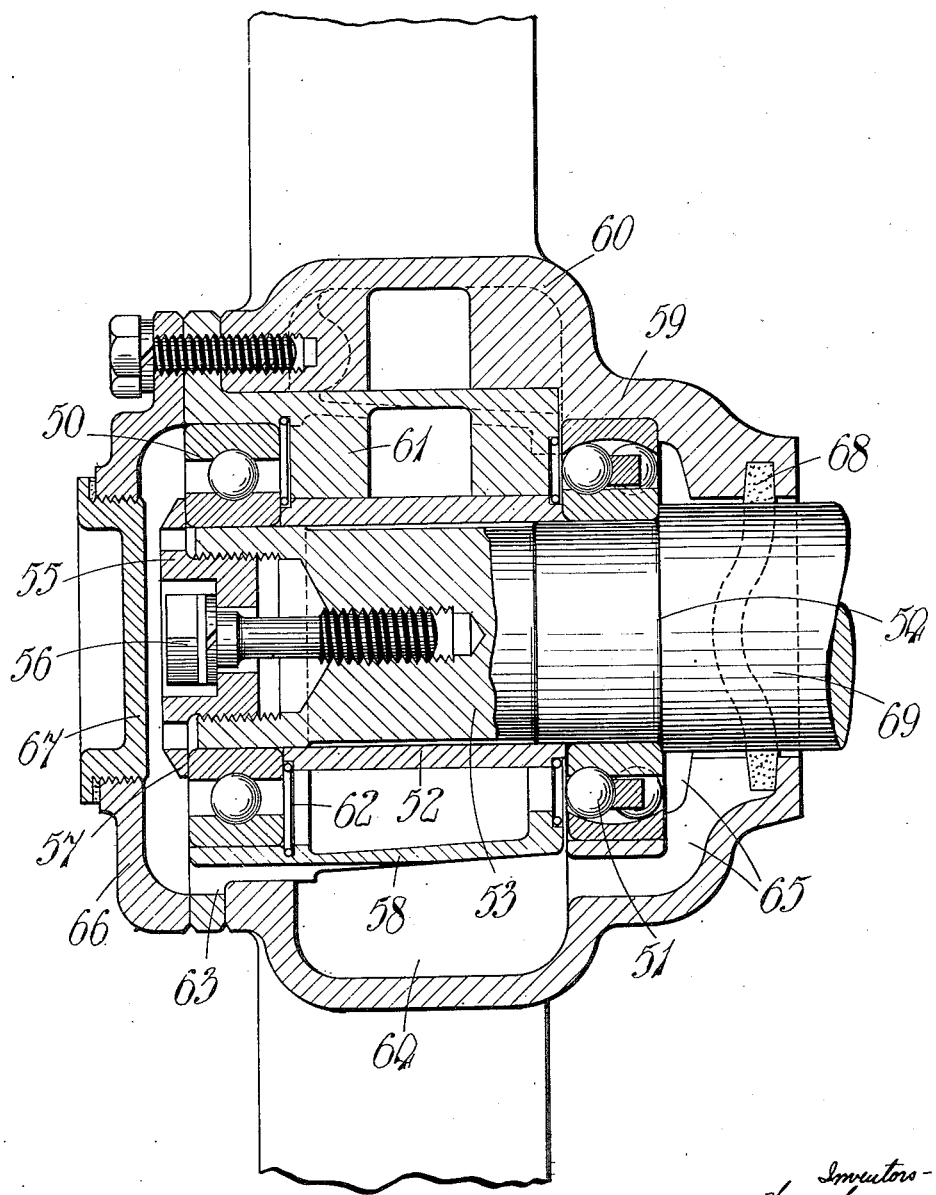
Figure 17 is a view in sectional side elevation shewing a construction employed for two spaced ball bearings.
Figure 18:
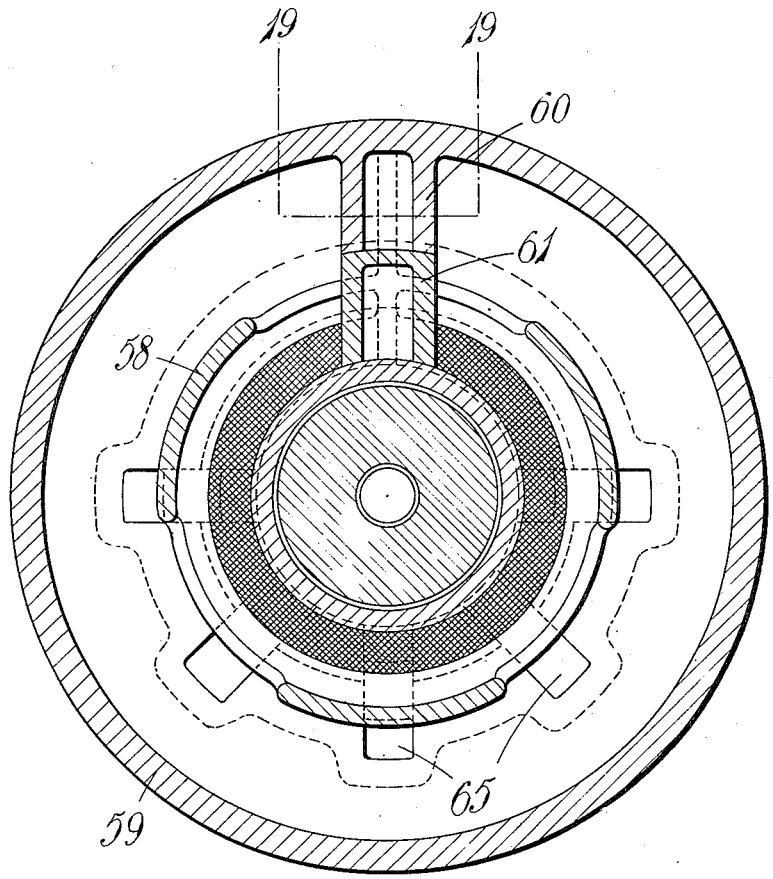
Figure 18 is a section upon the centre line of Figure 17.
Figure 19:
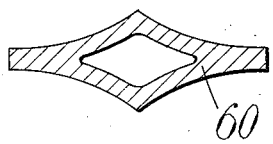
Figure 19 is a sectional plan taken on the line 19—19 shewn in Figure 18.

In Figures 17 18 and 19 is shewn a construction including two ball bearings 50 and 51 which are spaced apart by a sleeve 52 mounted upon an axle 53. The axle is provided with a shoulder 54 against which the ball bearing 51 abuts. The axle is also provided with a securing member 55 which is screwed into its end, and this member 55 is locked by a securing screw 56. The securing member 55 is provided with a flange 57 which serves to secure the ball bearing 50 against endwise movement. The outer races of the two ball bearings rotate with the wheel, the outer race of the bearing 50 being carried by a member 58 and the outer race of the bearing 51 being carried by the hub 59.

The hub 59 is provided with a vane 60 for lifting the lubricant, the said vane being made of a special double V shape in section, the sides of the vane being concave. This shaping of the vane 60 serves to direct the lubricant in two streams, one of which flows towards the bearing 50 and the other of which flows towards the bearing 51. The member 58 is also formed with a portion 61 which is of the same double V section as the portion 60. The lubricant flows to the ends of the member 58, passing through wire gauze filters 62 and the two bearings 50 and 51. After passing the bearings 50, the lubricant can pass over the end of the axle and through a return passage 63 to the well 64 in the hub 59. Similarly, the lubricant passing through the bearing 51 passes through a return passage 65 in the hub 59 back into the well 64.

Escape of lubricant at the ends of the bearing is prevented by closures. One closure takes the form of a cap 66 secured to the end of the member 58 and having a removable flange 67. The other closure takes the form of a washer 68 of felt or the like which co-operates with a ground or true surface 69 upon the axle.

Figure 20:
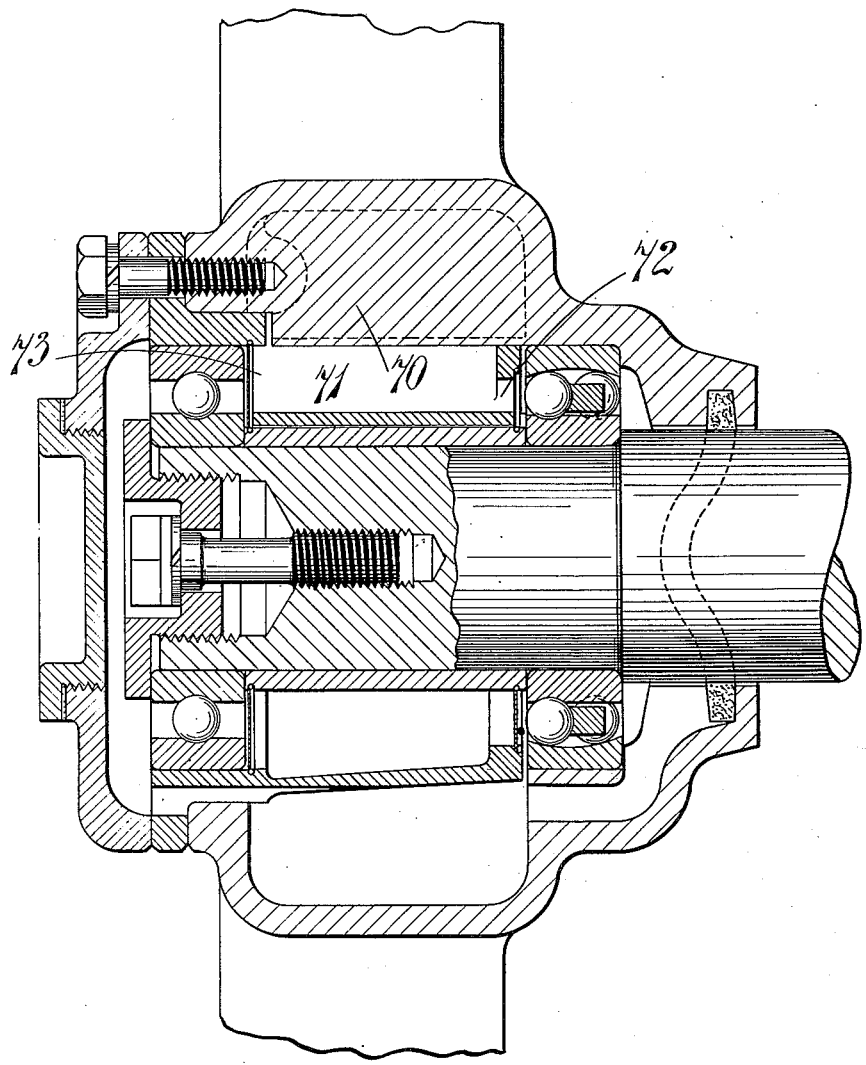
Figure 20 is a sectional view in side elevation shewing another method of applying the invention to two spaced ball bearings.
Figure 21:
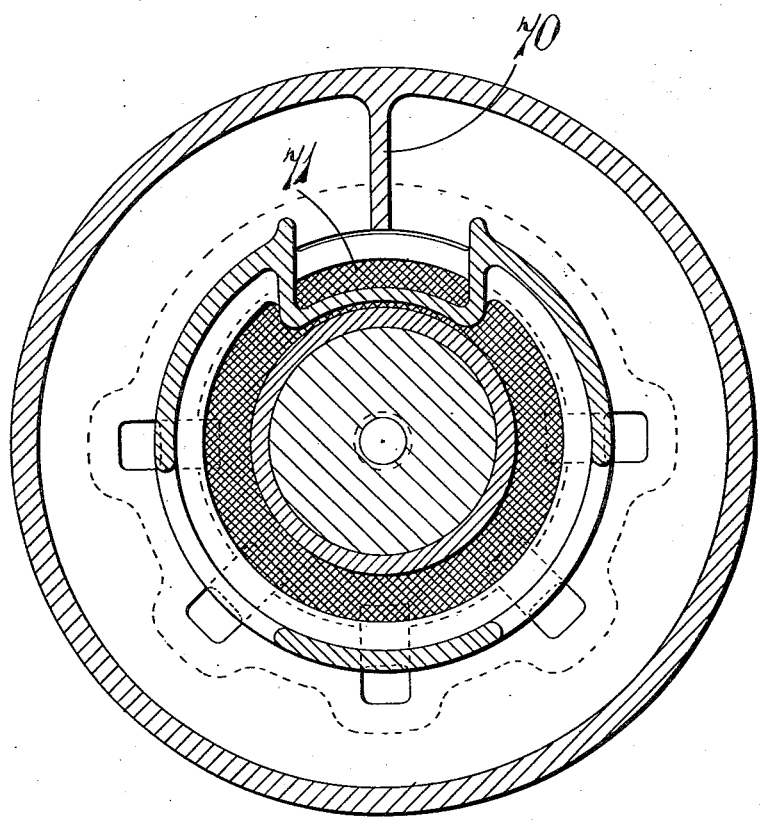
Figure 21 is a sectional view upon the centre line of Figure 20.

The construction illustrated in Figures 20 and 21 is similar to that shewn in Figures 17 18 and 19, except that the vane which is in Figures 20 and 21 denoted by the reference 70 is an ordinary flat vane and delivers the lubricant into a pocket 71 which is formed in a member otherwise similar to the member 58 in Figure 17. The pocket 71 is provided with ducts or channels 72 and 73 at its ends by which the lubricant may pass to the ball bearings.

What we claim then is:—

1. A means for lubricating slow speed rotary members mounted on axles comprising an axle and a rotary member mounted thereon, a chamber moving with the rotary member, a vane rotating with the rotary member, and adapted to raise the lubricant at each revolution from the said chamber and to direct it to the hub, said hub having a delivery passage disposed adjacent to the delivery end of said vane leading to the bearing, and a return passage leading to said chamber, thrust washers mounted at the ends of the hub, resilient washers forming closures to prevent the escape of lubricant between the hub and the axle, said resilient washers having their inner parts abutting against said thrust washers, end caps for the hub, and means for drawing and retaining said caps on to the ends of the hub, said caps engaging the outer parts of the resilient washers so as to deform them into dished formation.

2. A means for lubricating slow speed rotary members mounted on axles, comprising an axle and a rotary member mounted thereon, a chamber moving with the rotary member, a vane rotating with the rotary member and adapted to raise the lubricant at each revolution from the said chamber and to direct it to the hub, said hub having a delivery passage disposed adjacent to the delivery end of said vane leading to the bearing and a return passage leading to said chamber, a filter in the path of the lubricant, and closures to prevent the escape of lubricant between the hub and the axle whereby a free and closed circulation of lubricant is obtained automatically.

3. A means for lubricating slow speed rotary members mounted on axles comprising an axle and rotary member mounted thereon, a chamber moving with the rotary member, a vane rotating with the rotary member and adapted to raise the lubricant at each revolution from the said chamber and to direct it to the hub, said hub having a pocket for receiving the lubricant, a passage from said pocket to the bearing, and a return passage from the bearing to said chamber, a filter at the entrance to said pocket, and closures to prevent the escape of lubricant between the hub and the axle whereby a free and closed circulation of lubricant is obtained automatically.

4. A means for lubricating slow speed rotary members mounted on axles comprising an axle and a rotary member mounted thereon, a chamber moving with the rotary member, a vane rotating with the rotary member and adapted to raise the lubricant at each revolution from the said chamber and to direct it to the hub, said hub having a delivery passage disposed adjacent to the delivery end of said vane leading to the bearing, and a return passage leading to said chamber, thrust washers mounted at the ends of the hub, resilient washers forming closures to prevent the escape of lubricant between the hub and the axle, said resilient washers having their inner parts abutting against said thrust washers, end caps for the hub, and means for drawing and retaining said caps on to the ends of the hub, said caps engaging the outer parts of the resilient washers so as to deform them into dished formation.

5. A means for lubricating slow speed rotary members mounted on axles, comprising an axle and a rotary member mounted thereon, a chamber moving with the rotary member, a vane rotating with the rotary member and adapted to raise the lubricant at each revolution from the said chamber and to direct it to the hub, said hub having a delivery passage disposed adjacent to the delivery end of said vane leading to the bearing, and a return passage leading to said chamber, a filter in the path of the lubricant, and closures to prevent the escape of lubricant between the hub and the axle, said closures consisting of resilient discs bent into dished form in the act of assembling, whereby a free and closed circulation of lubricant is obtained automatically.

6. A means for lubricating slow speed rotary members mounted on axles, comprising an axle and a rotary member mounted thereon, a chamber moving with the rotary member, a vane rotating with the rotary member and adapted to raise the lubricant at each revolution from the said chamber and to direct it to the hub, said hub having a delivery passage adjacent the delivery end of said vane, a duct receiving lubricant from said passage, said duct extending partly around the circumference of the bearing, whereby the lubricant can select its own point of entry to the bearing surfaces, and a return passage leading to said chamber, and closures to prevent the escape of lubricant between the hub and the axle.

In witness whereof we affix our signatures.

HENRY GARNER.
JAMES PARKER GARNER.
SYDNEY SMITH.